United States Patent [19]
Smith

[11] 3,797,901
[45] Mar. 19, 1974

[54] SHAFT LOCKING DEVICE FOR A BEARING ASSEMBLY

[75] Inventor: Richard J. Smith, Valparaiso, Ind.

[73] Assignee: McGill Manufacturing Company, Inc., Valparaiso, Ind.

[22] Filed: Mar. 14, 1973

[21] Appl. No.: 341,092

[52] U.S. Cl. ................................. 308/236
[51] Int. Cl. ........................... F16c 35/06
[58] Field of Search.................. 308/236; 287/52.08

[56] References Cited
UNITED STATES PATENTS
2,419,691  4/1947  Shafer................................ 308/236

Primary Examiner—Charles J. Myhre
Assistant Examiner—Frank Susko

[57] ABSTRACT

The inner racering of a ball bearing assembly includes a portion which extends beyond the face of the bearing axially about a shaft extending through the racering bore. Two holes are drilled in the inner race extension and are spaced apart about the shaft by an angle measured in a radial direction from the shaft axes which subtends an arc of substantially between 30° to 60°. Set screws are threaded through the apertures and meet the shaft in an interference fit thereby locking the inner racering to the shaft.

6 Claims, 3 Drawing Figures

PATENTED MAR 19 1974　　3,797,901
FIG.1
FIG.2
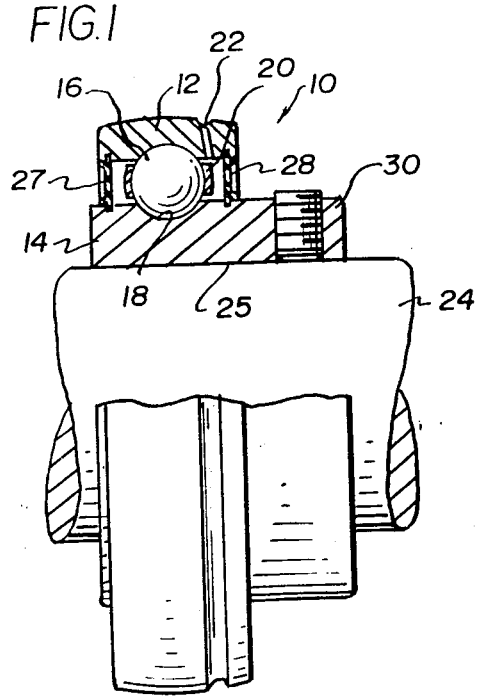
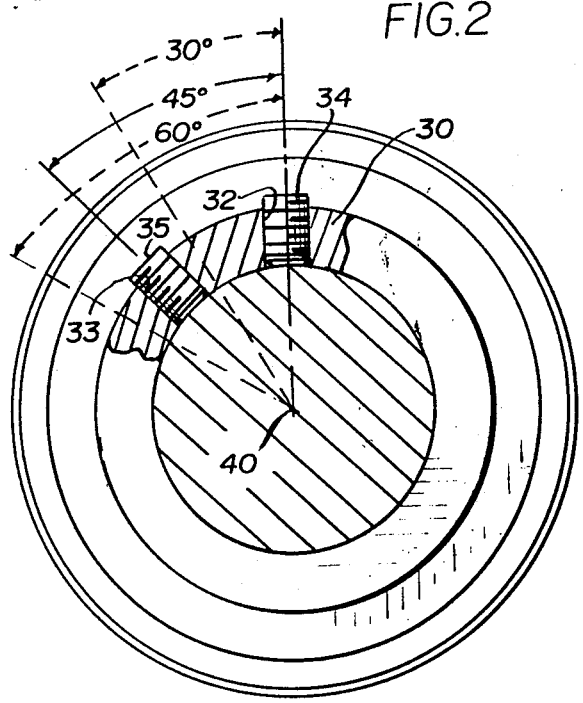
FIG.3
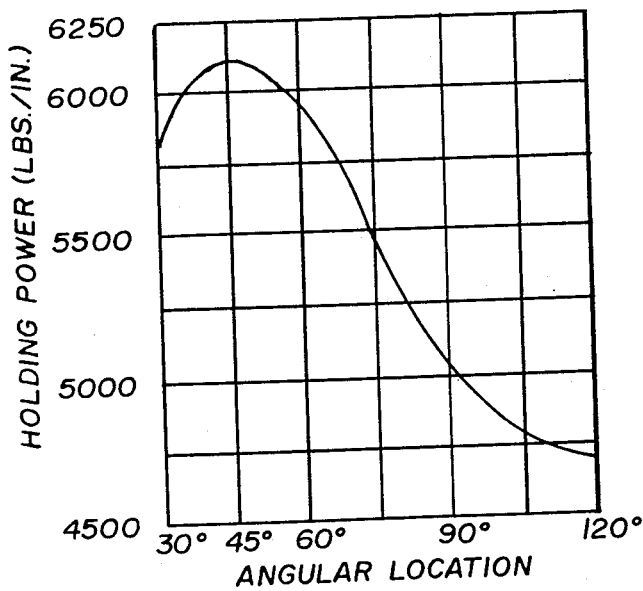

SHAFT LOCKING DEVICE FOR A BEARING ASSEMBLY

BACKGROUND OF THE INVENTION

This invention pertains to a shaft locking device for a bearing assembly.

A problem has long existed in the bearing industry relative to locking a bearing assembly such as a pillow block type bearing to a rotating shaft. Many complex structures have been designed for locking the inner racering of a bearing to the shaft but these have been very costly and generally ineffective. The simplest way of locking a pillow block bearing to the shaft and the most economical is through the use of set screws threaded through an extension of the inner racering, or a collar which is fitted about this extension, and into contact with the shaft. Typically, two set screws are used and these are positioned in a spaced apart relation subtending an arc of 120° measured in a radial direction from the shaft axis. In some applications, the set screws have been found to be spaced apart at an angle of 90°. The problem with these set screw locking devices has been that under difficult operating conditions, after a relatively short time, the bearing assembly becomes loose on the shaft. Typically, the life which can be expected from a two inch bore bearing assembly locked in this manner and operating under a load of 1,950 lbs. at 1150 RPM is anywhere from 3 minutes to a maximum of about 12 hours before the bearing becomes loose which generally causes failure in an operating installation. A further problem with this type of set screw locking is the fact that the operator generally must sequentially tighten first one set screw in position and then rotate the shaft in order to tighten the second set screw in position. In some applications where these shafts are coupled to machines through gearing and the like, it is almost impossible to rotate the shafts by hand. Therefore, many hours can be spent simply in trying to tighten the two set screws into an interference fit with the shaft.

SUMMARY OF THE INVENTION

It is an object of this invention to provide improved apparatus for locking a bearing assembly to a rotating shaft.

It is another object of this invention to provide apparatus for locking a bearing assembly to a rotating shaft which in most applications can be locked in place without rotating the shaft.

It is a further object of this invention to provide apparatus for locking a bearing assembly to a rotating shaft which greatly extends the operating life during which the shaft can be rotated.

In one embodiment of the invention, a bearing assembly having an inner member and an outer member which are relatively rotatable and which are spaced apart for receiving anti-friction elements and lubricant therebetween includes apparatus for connecting the inner member to a rotating shaft. The apparatus comprises threadable locking means threaded to make an interference fit with the rotating shaft. The locking means includes first and second threadable members or set screws that are positioned about the shaft in a spaced apart angular relationship by an angle measured in a radial direction from the shaft axis of substantially between 30° and 60°. The threadable members are tightened against the shaft to lock the bearing assembly thereto.

DESCRIPTION OF THE DRAWING

FIG. 1 is an elevation view partly in cross section illustrating a bearing assembly utilizing the improved locking apparatus in accordance with this invention;

FIG. 2 is a plan view partly in cross section of the bearing assembly of FIG. 1; and FIG. 3 is a graft illustrating the static holding power of the locking apparatus of FIG. 1 wherein the threadable members are positioned in various spaced apart angular locations about the shaft.

DETAILED DESCRIPTION

Referring to FIG. 1, there is shown a bearing assembly 10 which includes an outer racering 12 and an inner racering 14 which are spaced apart for receiving the anti-friction elements therebetween which in this example are the balls 16. The balls are retained in the bearing raceway 18 which is defined by the inner and outer racerings 14 and 12, respectively, by the retainer 20. The channel 22 provides means for introducing lubricant into the raceway 18. A shaft 24 is shown positioned through a bore 25 through the inner racering 14. Seal members 27 and 28 are positioned in opposite axial ends of the bearing assembly 10 and can be of a type more fully described in U.S. Pat. No. 3,449,029 which is assigned to the assignee of this application.

The inner racering 14 of the bearing assembly 10 includes a portion 30 which extends beyond the face of the bearing axially about the shaft 24. As shown in FIG. 2, two holes or apertures 32 and 33 are drilled and tapped into the extension 30 for receiving the first and second threadable members or set screws 34 and 35 respectively. In some applications rather than drilling and tapping the two holes through the extended portion of the inner race, the holes are only drilled therethrough and a collar is fitted about the extended portion as is well known in the art. Corresponding holes are drilled and tapped in the collar. The set screws are then threaed through the collar and through the holes in the extended portion of the inner race into an interference fit with the shaft 24 to lock the bearing assembly 10 to the shaft.

In the past, the apertures 32 and 33 were spaced about the shaft by an angle measured in a radial direction from the shaft axis 40 which subtends an arc generally of about 120°. In some applications, this angle was reduced to about 90°; however, in accordance with this invention a surprising result has occurred by locating the apertures in a spaced apart relation about the shaft by an angle measured in the radial direction from the shaft axis, which subtends an arc of substantially between 30° to 60° as shown in FIG. 2. With the apertures so located, the set screws are threaded therethrough and meet the shaft in an interference fit to lock the inner racering to the shaft.

By referring to the chart of FIG. 3, the increased holding power under static loads obtained by positioning the two set screws between 30° and 60° apart is readily apparent. This graph illustrates the holding power of the locking apparatus in lbs. per inch compared to the angular location about the shaft of the set screws. As can be seen by the graph, the maximum holding power falls in the range of 30° to 60° and is greatest at 45°. This result is totally unexpected. Furthermore, by locating the set screws between 30° and 60° apart, dynamic tests in the laboratory have established that the operating life of the bearing assembly on the shaft before it loosens has been extended from the previous expected life of set screw locking devices of three minutes to a maximum of 12 hours of operating time to between 1100 and 1200 hours which is up to a hundred times better performance than previously achieved.

Finally, because the two set screws are only located 30° to 60° apart, for most applications the set screws can be tightened to the shaft together without rotating the shaft thereby greatly reducing the time for assembling the bearing to the shaft.

What has been described above therefore, is improved apparatus for locking a bearing assembly to a rotating shaft which dramatically extends the time of operation of the shaft before the bearing assembly becomes loose, thereby causing bearing failure, and which permits initial mounting of the bearing assembly to the shaft without rotating the shaft.

I claim:
1. In a bearing assembly having an inner member and an outer member which are relatively rotatable and which are spaced apart for receiving anti-friction elements and lubricant therebetween and having apparatus for connecting one of the inner and outer members to a rotating shaft which apparatus includes threadable locking means threaded to make an interference fit with the rotating shaft, the improvement characterized by the threadable locking means including first and second threadable members, said first and second threadable members positioned about the shaft in a spaced apart angular relationship and contacting the shaft in an interference fit to lock the selected one of the inner and outer members to the shaft, said threadable members being spaced apart on said shaft by an angle of substantially between 30° and 60° measured in a radial direction from the shaft axis.

2. The bearing assembly of claim 1 wherein said threadable members are set screws.

3. The bearing assembly of claim 2 wherein the shaft extends through a bore in the inner member which inner member further includes a portion extending axially about the shaft, and wherein the set screws are threaded through the axially extending portion of the inner member thereby engaging the shaft in an interference fit.

4. In a ball bearing assembly having an outer racering and an inner racering which are relatively rotatable and which are spaced apart for receiving balls and lubricant therebetween, the assembly further including the inner racering having a portion extending beyond the face of the bearing about a shaft positioned in a bore in the inner racering which extension includes a plurality of apertures for receiving locking members therein to lock the inner racering to the shaft, the improvement being characterized by said extension of the inner racering having two apertures spaced apart about the shaft by an angle measured in a radial direction from the shaft axis which subtends an arc of substantially between 30° to 60°, and set screws threaded through said apertures and meeting said shaft in an interference fit thereby locking the inner racering to the shaft.

5. The ball bearing assembly of claim 4 wherein said angle subtends an arc of 45°.

6. The ball bearing assembly of claim 4 further including seal means for preventing contaminants from entering the space between the inner and outer racering.

* * * * *